US010625953B2

(12) United States Patent
Hasegawa et al.

(10) Patent No.: US 10,625,953 B2
(45) Date of Patent: Apr. 21, 2020

(54) ROBOT

(71) Applicant: KAWASAKI JUKOGYO KABUSHIKI KAISHA, Kobe-shi, Hyogo (JP)

(72) Inventors: Shogo Hasegawa, Kakogawa (JP); Satoru Hibino, Kobe (JP); Hideshi Yamane, Kakogawa (JP); Hiroyuki Mizumoto, Kobe (JP); Kenji Bando, Nishinomiya (JP); Daichi Himekawa, Nishinomiya (JP); Junichi Matsuoka, Kobe (JP); Tatsuhiro Uto, Akashi (JP); Hiroki Kokushi, Kakogawa (JP); Souichi Tamada, Akashi (JP); Akihiro Haneda, Kakogawa (JP); Yukio Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 176 days.

(21) Appl. No.: 15/776,441

(22) PCT Filed: Nov. 15, 2016

(86) PCT No.: PCT/JP2016/004886
§ 371 (c)(1),
(2) Date: May 16, 2018

(87) PCT Pub. No.: WO2017/085928
PCT Pub. Date: May 26, 2017

(65) Prior Publication Data
US 2018/0339867 A1  Nov. 29, 2018

Related U.S. Application Data

(60) Provisional application No. 62/255,902, filed on Nov. 16, 2015.

(51) Int. Cl.
B65G 47/52 (2006.01)
B25J 9/04 (2006.01)
B25J 9/16 (2006.01)

(52) U.S. Cl.
CPC ............. *B65G 47/52* (2013.01); *B25J 9/043* (2013.01); *B25J 9/044* (2013.01); *B25J 9/1682* (2013.01)

(58) Field of Classification Search
CPC combination set(s) only.
See application file for complete search history.

(56) References Cited

U.S. PATENT DOCUMENTS 6,357,994 B1* 3/2002 St. Onge ................. B23F 23/04
198/468.2
2003/0075051 A1* 4/2003 Watanabe ............... B65B 5/105
99/325

(Continued)

FOREIGN PATENT DOCUMENTS

CN 104608128 A 5/2015
DE 60216035 T2 2/2007

(Continued)

*Primary Examiner* — Kyle O Logan
(74) *Attorney, Agent, or Firm* — Oliff PLC (57) ABSTRACT

A robot configured to perform a work to a moving workpiece is provided, which includes a first robotic arm provided at a tip end thereof with a guide tool configured to support the workpiece, a second robotic arm provided at a tip end thereof with a work tool configured to perform a specific work to the workpiece, and a control device configured to control operations of the first and second robotic arms. The control device controls the operations of the first and second robotic arms according to timing information for which the workpiece reaches a workspace of the robot so that the guide tool guides the workpiece located in the workspace into the space and the work tool performs the specific work to the workpiece guided into the space.

5 Claims, 9 Drawing Sheets

(56) References Cited

U.S. PATENT DOCUMENTS

| | | | |
|---|---|---|---|
| 2008/0316306 A1 | 12/2008 | Burkle et al. | |
| 2010/0298973 A1* | 11/2010 | Doke | B25J 9/0093 700/230 |
| 2011/0290090 A1* | 12/2011 | Urabe | B25J 9/1682 83/23 |
| 2012/0197438 A1* | 8/2012 | Ogami | B25J 9/1682 700/258 |
| 2014/0277734 A1 | 9/2014 | Ichimaru et al. | |
| 2015/0032243 A1* | 1/2015 | Shiino | B58J 9/0093 700/112 |
| 2015/0127141 A1 | 5/2015 | Kawada et al. | |
| 2017/0115651 A1* | 4/2017 | Wu | G05B 19/41865 |

FOREIGN PATENT DOCUMENTS

| | | |
|---|---|---|
| DE | 10 2014 102 068 A1 | 8/2014 |
| GB | 1510391 A | 5/1978 |
| JP | S62-218085 A | 9/1987 |
| JP | S64-28120 A | 1/1989 |
| JP | H04-028621 A | 1/1992 |
| JP | H09-091015 A | 4/1997 |
| JP | 2004-244141 A | 9/2004 |
| JP | 2011-115877 A | 6/2011 |
| JP | 2012-035391 A | 2/2012 |
| JP | 2012-196768 A | 10/2012 |
| JP | 2014-176922 A | 9/2014 |
| JP | 2015-085479 A | 5/2015 |
| JP | 2015-186834 A | 10/2015 |
| TW | 201024053 A | 7/2010 |
| WO | 2013/157120 A1 | 10/2013 |

* cited by examiner

ROBOT

TECHNICAL FIELD

The present disclosure relates to a robot.

BACKGROUND ART

In recent years, in terms of improving productivity, it has been proposed that a robot performs a work which is similar to a work conventionally performed by a human in a manufacturing site, such as a factory. For example, Patent Document 1 discloses a robot which performs works, such as gripping an object, moving the gripped object, and combining a plurality of objects. Patent Document 2 discloses a robot which performs a work to handle a workpiece by using a 3D camera (bin-picking). Patent Document 3 discloses a robot which performs a work to change the way the robot holds a workpiece by using a hand and a contact sensor for the workpiece. Moreover, Patent Document 4 discloses a robot which performs an assembly work (fitting etc.) of a flexible object by using a camera and a force sensor.

REFERENCE DOCUMENTS OF CONVENTIONAL ART

Patent Documents

[Patent Document 1] JP2015-186834A
[Patent Document 2] JP2014-176922A
[Patent Document 3] JP2012-196768A
[Patent Document 4] JP2011-115877A

DESCRIPTION OF THE DISCLOSURE

Problems to be Solved by the Disclosure

However, the conventional robots described above all assume the work for the stationary workpiece. Thus, in order to perform a specific work to the workpiece which is moving on a conveyor etc., a tracking control etc. for recognizing the position of the moving workpiece is additionally required, resulting in a complicated structure of the system.

The present disclosure is made in order to solve the problems described above, and one purpose thereof is to realize a robot which is capable of performing a specific work to a moving workpiece, with a comparatively simple structure.

Summary of the Disclosure

In order to achieve the purpose, a robot according to one aspect of the present disclosure is a robot configured to perform a work to a moving workpiece, which includes a first robotic arm provided at a tip end thereof with a guide tool configured to support the workpiece, a second robotic arm provided at a tip end thereof with a work tool configured to perform a specific work to the workpiece, and a control device configured to control operations of the first and second robotic arms. The control device controls the operations of the first and second robotic arms according to timing information for which the workpiece reaches a workspace of the robot so that the guide tool guides the workpiece located in the workspace into the space and the work tool performs the specific work to the workpiece guided into the space.

According to this configuration, the workpiece located in the workspace is guided into the workspace by the guide tool provided to the tip end of the first robotic arm, according to the timing information for which the moving workpiece reaches the workspace of the robot, and the work is performed to the workpiece guided into the workspace by the work tool provided to the tip end of the second robotic arm. Thus, the work can be performed to the moving workpiece according to the timing information, without performing a tracking control etc. of the workpiece.

The robot may further include a detecting means for detecting a timing at which the workpiece reaches the workspace of the robot and outputting a detection signal to the control device.

According to this configuration, the timing at which the workpiece reaches the workspace of the robot can correctly be calculated. For example, the timing at which the workpiece reaches may be detected by a photoelectric sensor provided near a conveyor which conveys the workpiece, or the timing information may be calculated by analyzing an image of a fixedly-installed camera.

The robot may further include a contact sensor configured to detect that the guide tool contacts the workpiece and output a detection signal to the control device. The control device may control the operation of the second robotic arm so that the work tool performs the specific work to the workpiece when the detection signal is received from the contact sensor.

The first robotic arm may be configured to regulate a movement of the workpiece in a conveying direction of the conveyor and maintain the workpiece in a given posture, by the guide tool performing operation to guide the workpiece being conveyed on the conveyor in a given direction in width directions of the conveyor. The second robotic arm may be configured to perform a work to supply a given object to the workpiece that became in the given posture.

The robot may further include a regulating member configured to stop within the workspace the workpiece located in the workspace. The first robotic arm may support one side surface of the workpiece located in the workspace by the guide tool and guide another side surface of the workpiece toward the regulating member.

According to this configuration, it becomes easy to maintain the workpiece in the given posture, by supporting the one side surface of the workpiece located in the workspace by the guide tool, and guiding the another side surface of the workpiece toward the regulating member.

Effect of the Disclosure

The present disclosure can realize the robot which is capable of performing the specific work to the moving workpiece, with the comparatively simple structure.

MODES FOR CARRYING OUT THE DISCLOSURE

Hereinafter, preferable embodiments will be described with reference to the drawings. Note that, below, the same referential characters are given to the same or corresponding elements throughout the drawings to omit redundant description. Moreover, in order to make them easy to understand, the drawings are to schematically illustrate each component, and the shape, a dimension ratio, etc. may not be illustrated correctly.

First Embodiment

A robot according to a first embodiment is, for example, used at a food factory which produces box lunch (bento) etc. Moreover, although in this embodiment a case where a horizontal articulated type dual-arm robot is used as one example of the robot will be described, an articulated robot having a plurality of robotic arms can be used, regardless of the horizontal articulated type or a vertical articulated type.
[One Example of Structure of Robot]

Figure 1:
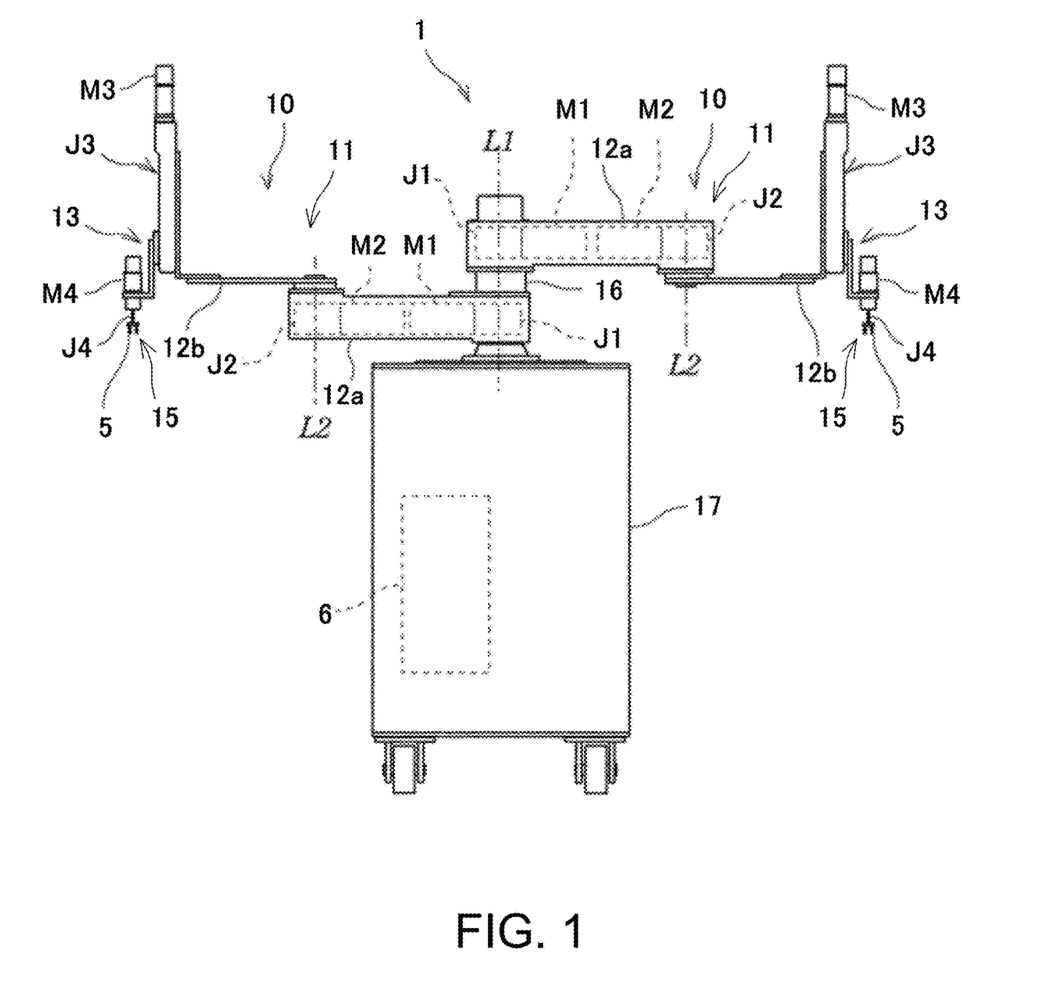
FIG. 1 is an outline front view illustrating one example of a structure of a robot according to a first embodiment.
Figure 2:
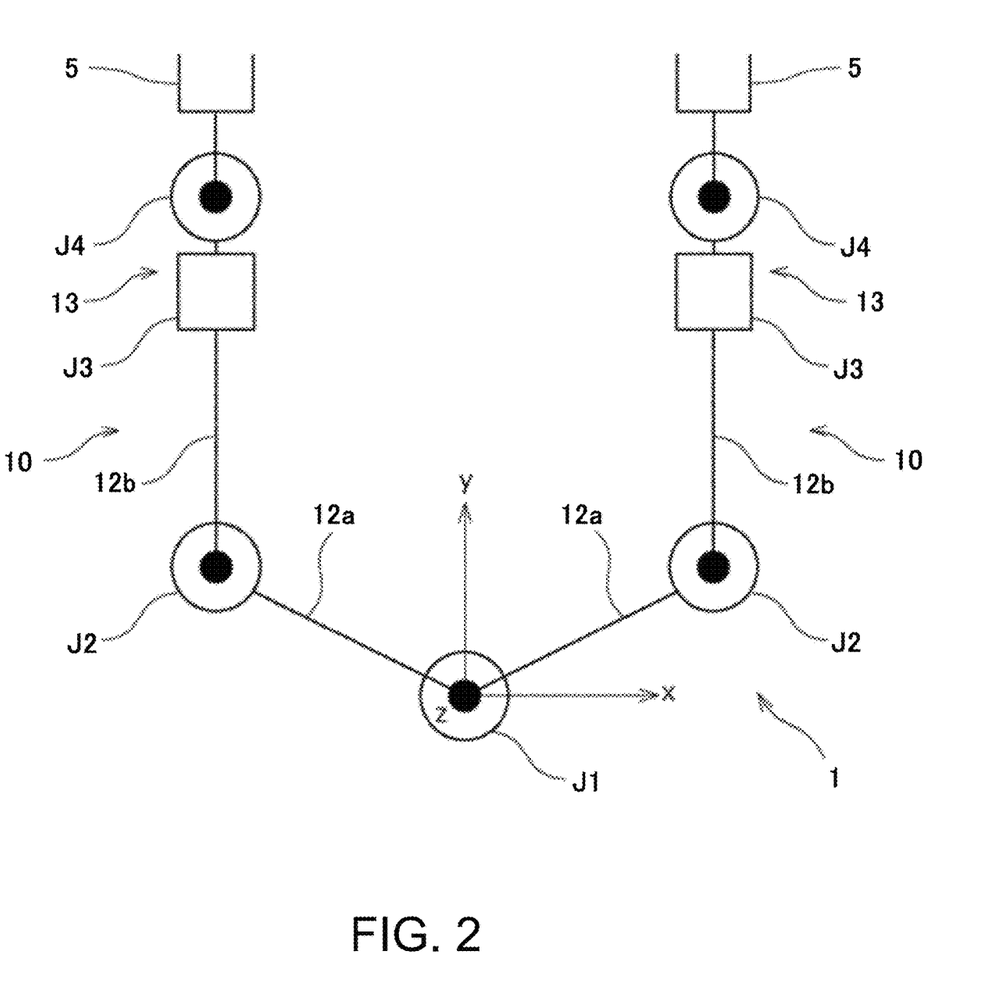
FIG. 2 is a schematic plan view of the robot of FIG. 1.

FIG. 1 is a front view illustrating the entire structure of one example of the robot according to the first embodiment, and FIG. 2 is the schematic plan view. As illustrated in FIGS. 1 and 2, a robot 1 includes a carrier 17, a pair of robotic arms (hereinafter, simply referred to as "the arm(s)") 10 supported by the carrier 17, and a control device 6 accommodated in the carrier 17.

This robot 1 is a dual-arm robot having left and right arms 10. The left and right arms 10 are capable of operating independently, and are capable of operating in a mutually-related manner.

Each arm 10 is a horizontal articulated type robotic arm, and includes an arm part 11, a wrist part 13, and a hand part 15. In this example, the arm part 11 is comprised of a first link 12a and a second link 12b. Moreover, the hand part 15 is comprised of a tool 5, and the wrist part 13 has a mechanical interface to which the tool 5 is attached. Note that the left and right arms 10 have substantially the same structure except for the hand parts 15, and the tools 5 of the left and right hand parts 15 may have the same structure or may have different structures.

The first link 12a of the arm part 11 is coupled to a base shaft 16 fixed to an upper surface of the carrier 17 by a revolute joint. The first link 12a is rotatable on a vertical rotational axis L1 passing through the axial center of the base shaft 16. Moreover, the second link 12b is coupled to a tip end of the first link 12a by a revolute joint. The second link 12b is rotatable on a vertical rotational axis L2 defined at the tip end of the first link 12a.

The wrist part 13 is coupled to a tip end of the second link 12b by a prismatic joint, and is movable upward and downward with respect to the second link 12b.

The tool 5 of the hand part 15 is coupled to the wrist part 13 by a revolute joint, and is rotatable on a vertical rotational axis.

Each arm 10 of the structure described above has joint axes J1-J4 corresponding to the respective joints. The arm 10 is provided with driving servo motors (not illustrated) and encoders (not illustrated) which detect rotational angles of the servo motors, so that they are associated with the joint axes J1-J4, respectively.

The rotational axes L1 of the first links 12a of the two arms 10 of the structure described above are on the same straight line, and the first link 12a of one arm 10 and the first link 12a of the other arm 10 are disposed with a vertical height difference. The origin of a basic coordinate system of the robot 1 is defined on the rotational axis L1 of the first link 12a.

Figure 3:
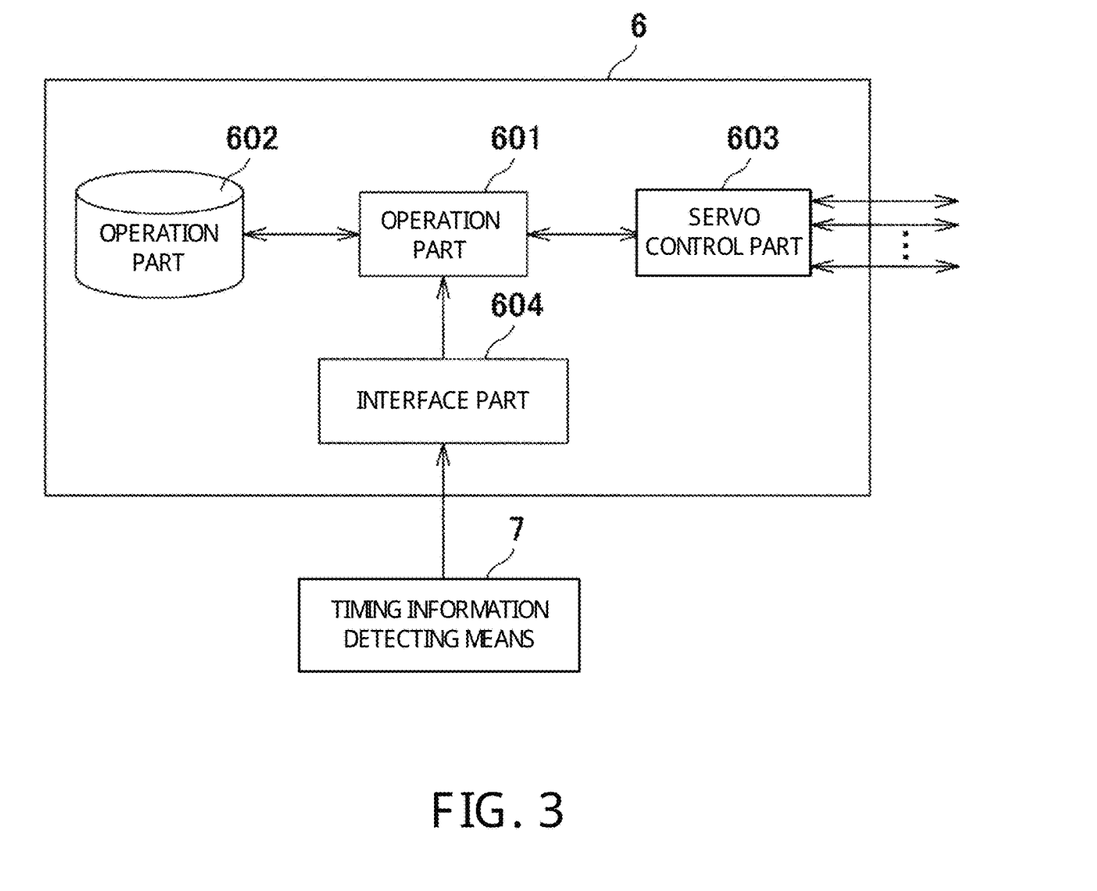
FIG. 3 is a block diagram illustrating an outline configuration of a control device of the robot of FIG. 1.

Next, the control device 6 is described. FIG. 3 is a block diagram illustrating an outline configuration of the control device 6. As illustrated in FIG. 3, the control device 6 includes an operation part 601 such as a CPU, a memory part 602, such as a ROM and/or a RAM, a servo control part 603, and an interface part 604. The control device 6 is a robot controller provided with, for example, a computer, such as a microcontroller. Note that the control device 6 may be comprised of a single control device which carries out a centralized control, or may be comprised of a plurality of control devices which carry out a distributed control in which the control devices collaborate mutually.

The memory part 602 stores information, such as a basic program as a robot controller, various fixed data, etc.

The operation part 601 controls various operations of the robot 1 by reading and executing software, such as the basic program stored in the memory part 602. That is, the operation part 601 generates a control instruction of the robot 1, and outputs this to the servo control part 603. The servo control part 603 is configured to control the drive of the servo motors corresponding to the joint axes J1-J4 of each arm 10 of the robot 1 based on the control instruction generated by the operation part 601.

The interface part 604 is communicatably connected with a timing information detecting means 7, and outputs a detection signal acquired from the timing information detecting means 7 to the operation part 601.

Moreover, if the tool 5 of the hand part 15 is configured to perform operation of a chuck, adsorption, etc., the control of the operation is also performed by the control device 6. Further, if the tool 5 chucks another tool and this another tool performs the operation of the chuck, adsorption, etc., the control of the operation of another tool is also performed by the control device 6. Thus, the control device 6 controls the entire operation of the robot 1.

Note that, if the tool 5 chucks another tool, the hand part 15 is constituted by the tool 5 and the another tool. Moreover, the tool 5 is replaceable.

Figure 4:
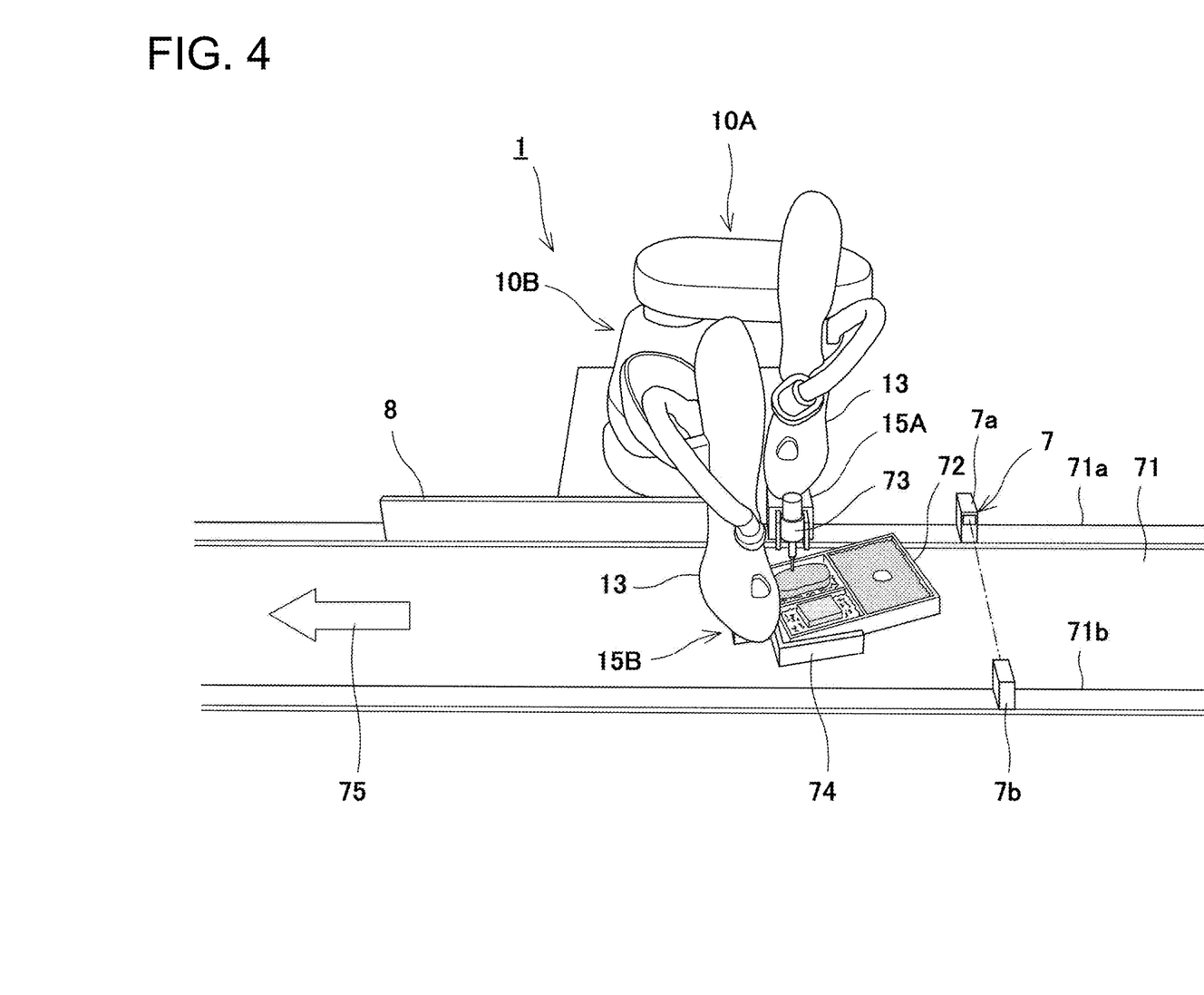
FIG. 4 is a view illustrating the entire structure of the robot which performs a specific work.

FIG. 4 is a view illustrating the entire structure of the robot which performs a specific work. Below, directions of the pair of arms being wide spread is referred to as left-and-right directions, directions parallel to the axial center of the base shaft is referred to as vertical directions, and directions perpendicular to the left-and-right directions and the vertical directions is referred to as front-and-rear directions. As illustrated in FIG. 4, a conveyor 71 is disposed in front of the robot 1. By the conveyor 71, the workpiece 72 is conveyed in a direction of an arrow 75. In this embodiment, the robot 1 performs the specific work to the moving workpiece 72 by the conveyor 71. A "workspace" of the robot 1 is a space around the robot 1, and is a space which covers the conveyor 71. A pair of side walls 71a and 71b which define a flow of an object to be conveyed are provided on both sides of a belt of the conveyor 71. A photoelectric sensor is provided to these side walls as the timing information detecting means 7. A regulating member 8 is provided to the side wall 71a at a location downstream of a light-emitting part 7a of the photoelectric sensor. The regulating member 8 has a flat-plate shape and the principal surface thereof is oriented toward the conveyor 71.

The photoelectric sensor has the light-emitting part 7a provided to one side wall 71a on the robot 1 side, and a light-receiving part 7b provided to the other side wall 71b. This photoelectric sensor is configured so that light, such as visible light or infrared light, is emitted from the light-emitting part 7a, a change in quantity of light shaded by a detected object on the conveyor 71 is detected by the light-receiving part 7b, and a detection signal is generated. Thus, the photoelectric sensor detects the workpiece 72 which is conveyed by the conveyor 71. This detection signal is inputted into the control device 6 of the robot 1 (see FIG. 3).

The hand part 15 (15A) of the first robotic arm 10A of the robot 1 (hereinafter, may be referred to as "the first arm 10A") has a work tool 73 which performs the specific work to the workpiece 72. Moreover, the hand part 15 (15B) of the second robotic arm 10B (hereinafter, may be referred to as "the second arm 10B") has a guide tool 74 which supports the workpiece 72 and guides it in a given direction. The control device 6 (see FIG. 3) is configured to control operations of the first arm 10A and the second arm 10B so that the guide tool 74 guides, according to timing information for which the workpiece 72 reaches the workspace of the robot 1, the workpiece 72 located in the workspace into the workspace, and the work tool 73 performs the work to the workpiece 72 guided into the space.

In this embodiment, the workpiece 72 is a lunch box containing cooked rice and a plurality of kinds of side dishes. The "specific work" of the robot 1 is a work to pour sauce over a specific dish (e.g., a hamburg steak) in the lunch box. In this case, the work tool 73 is a sauce discharging device, and the guide tool 74 is a guide member for guiding the lunch box. The guide tool 74 has a shape bent in a substantially L-shape in a plan view.

Moreover, since the first and second arms 10A and 10B includes the hand parts 15A and 15B, respectively, as described above, operations by the tools of the hand parts 15A and 15B may be described as the operations by the first and second arms 10A and 10B.

[Operation of Robot]

Figure 5:
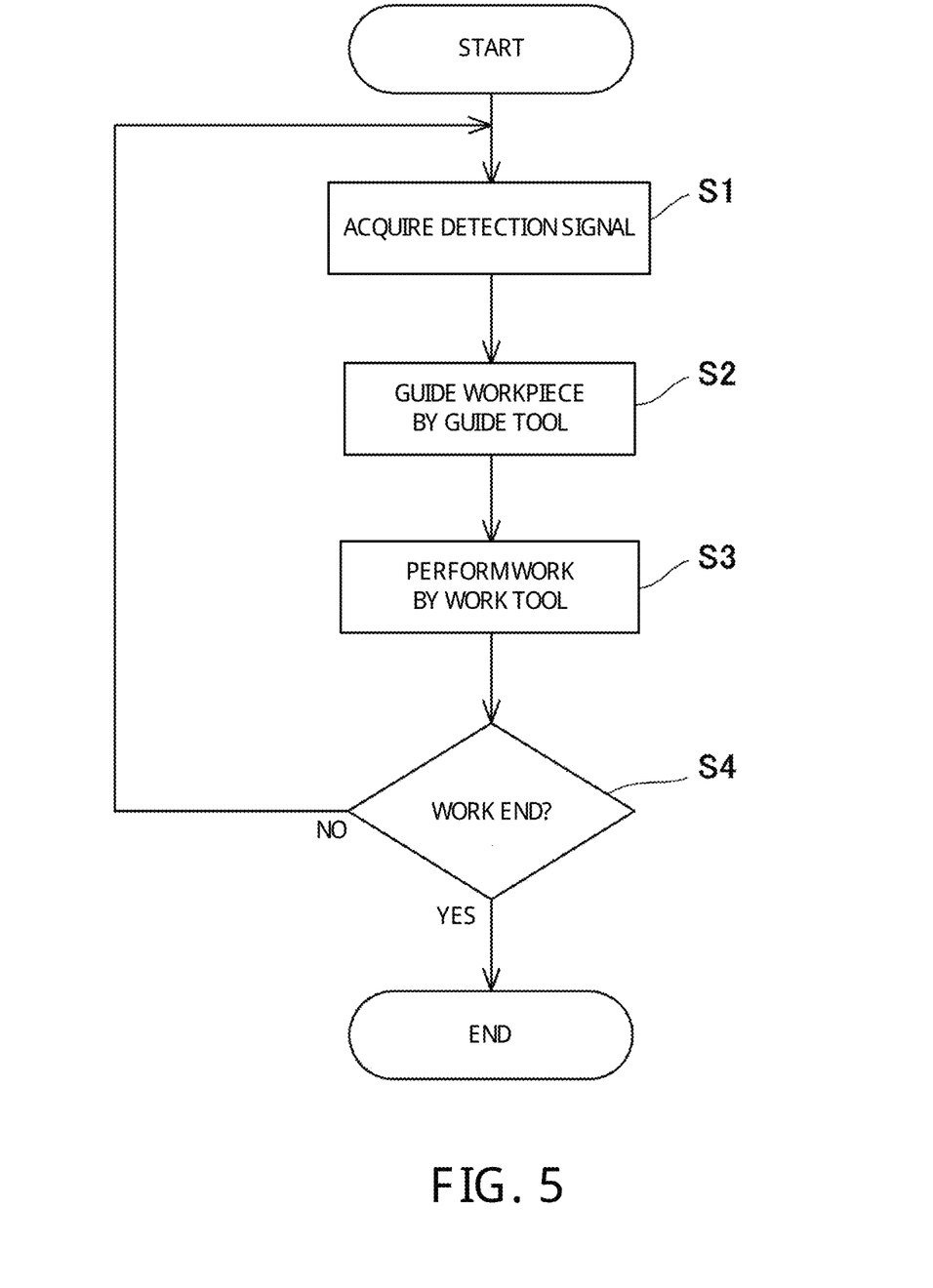
FIG. 5 is a flowchart illustrating one example of operation of the robot of FIG. 4.

Next, operation of the robot 1 of the above structure is described. FIG. 5 is a flowchart illustrating one example of the operation of the robot 1 which performs the specific work.

Figure 6:
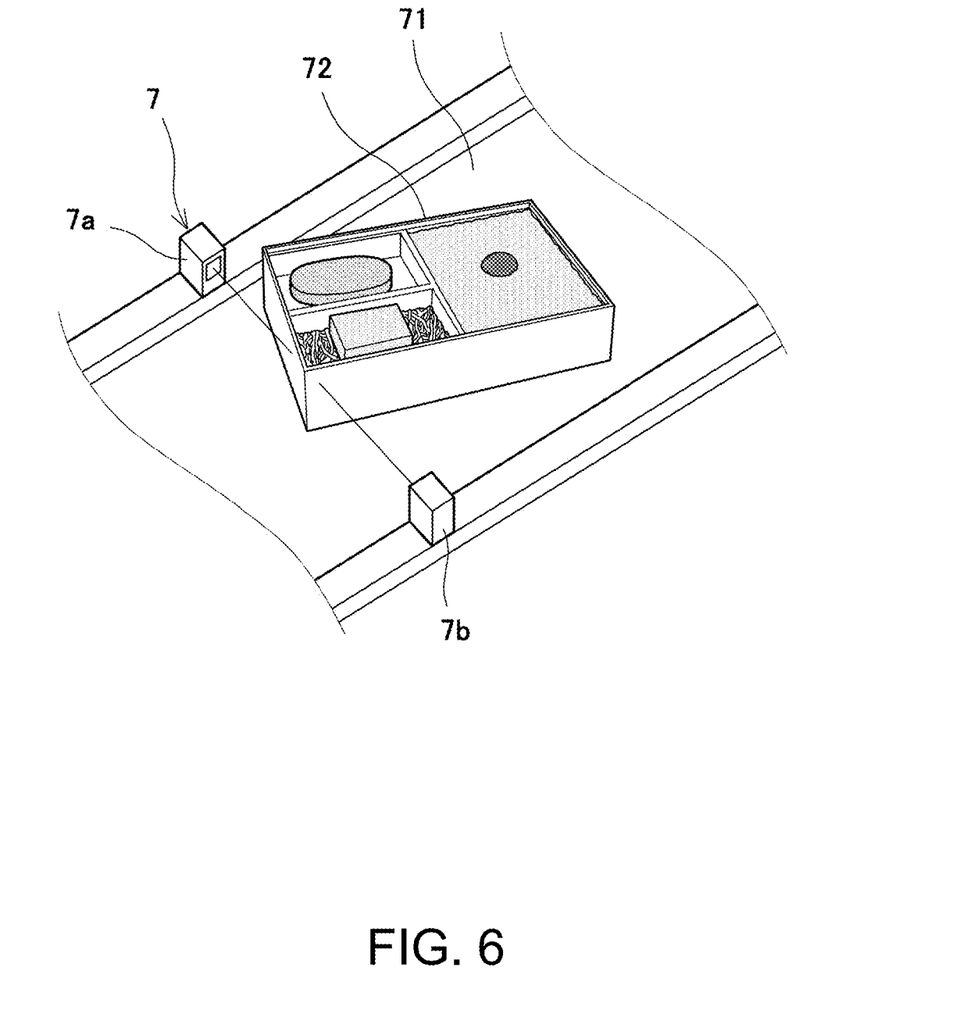
FIG. 6 is a view illustrating one example of a timing information detecting means.

First, the control device 6 acquires the detection signal from the timing information detecting means 7, and generates the timing information for which the workpiece 72 reaches the workspace of the robot 1 (Step S1 of FIG. 5). FIG. 6 is a view illustrating one example of the operation for detecting the timing information by the timing information detecting means 7 (photoelectric sensor). As illustrated in FIG. 6, the photoelectric sensor emits light, such as visible light or infrared light, from the light-emitting part 7a, detects by the light-receiving part 7b the change in the quantity of light shaded by the workpiece (lunch box) 72 conveyed by the conveyor 71, and generates the detection signal. Although the workpiece (lunch box) 72 conveyed by the conveyor 71 does not take a specific posture, the photoelectric sensor detects the workpiece (lunch box) 72 conveyed by the conveyor 71. This detection signal is inputted into the control device 6 of the robot 1 (see FIG. 3). The control device 6 generates the timing information for which the workpiece 72 reaches the workspace of the robot 1 based on the acquired detection signal. Here, a period of time from the workpiece 72 being detected by the photoelectric sensor to being conveyed by the conveyor 71 to the workspace of the robot 1 is stored beforehand in the memory part 602. By adding the time described above to the detection timing of the photoelectric sensor, a timing at which the workpiece reaches the workspace of the robot 1 can correctly be calculated.

Next, the control device 6 guides into the space the workpiece 72 which is about to reach the workspace of the robot 1, by the guide tool 74 according to the timing information (Step S2 of FIG. 5). The control device 6 controls the operations of the first and second arms 10A and 10B to cause the work tool 73 to perform the work to the workpiece 72 guided into the space (Step S3 of FIG. 5).

Figure 7:
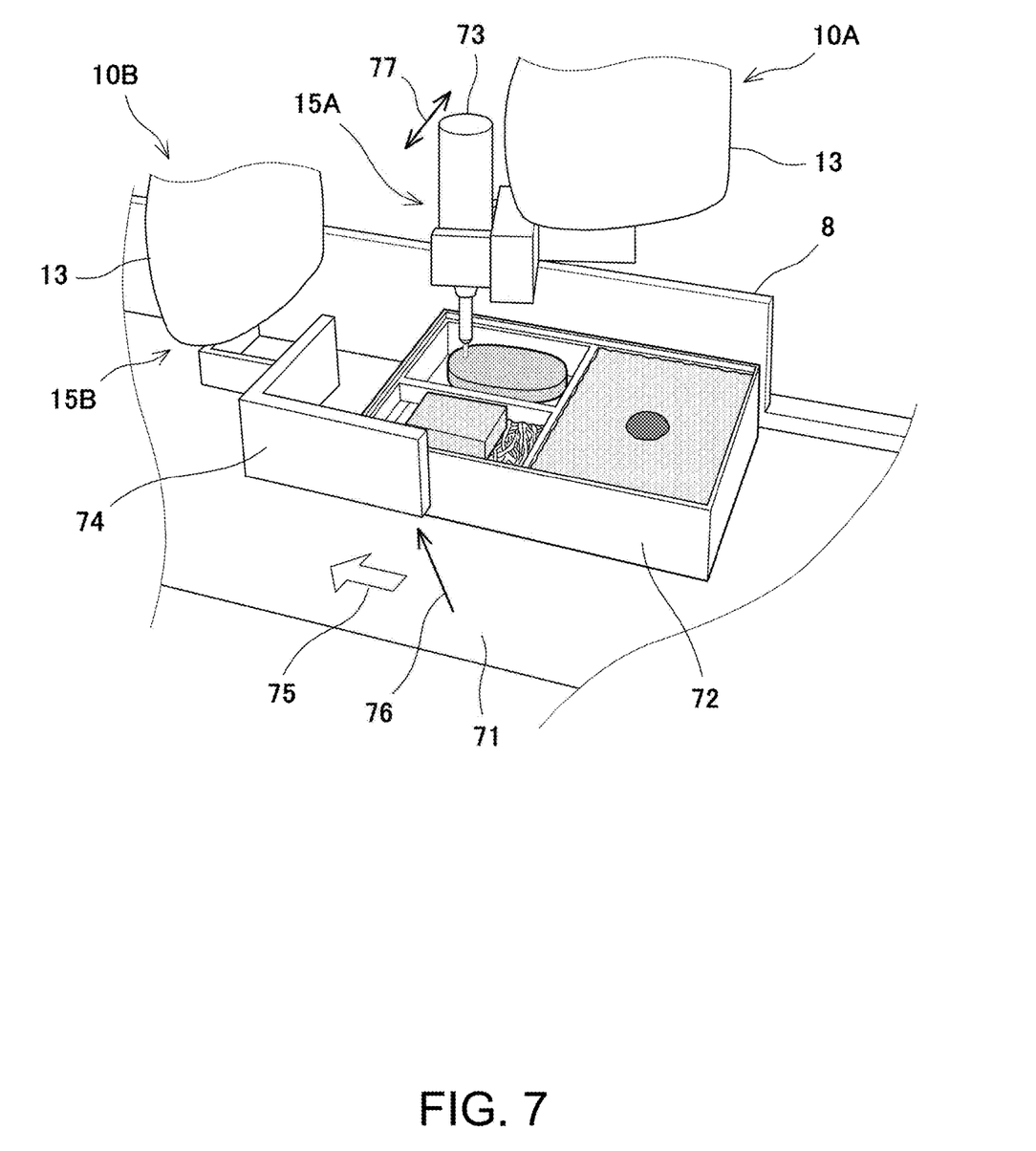
FIG. 7 is a view illustrating one example of operation by the robot.

FIG. 7 is a view illustrating one example of the operations of Steps S2 and S3. The guide tool 74 is formed in the shape bent in the substantially L-shape in the plan view, and as illustrated in FIG. 7, the second arm 10B moves the guide tool 74 in a direction of an arrow 76. Thus, the workpiece (lunch box) 72 is guided along the guide tool 74 to one end side in width directions of the conveyor 71. Here, while the one side surface of the workpiece (lunch box) 72 located in the workspace being supported by the guide tool 74, another side surface of the workpiece (lunch box) 72 is guided toward the regulating member 8. Thus, while the movement of the workpiece (lunch box) 72 in the conveyor conveying direction is regulated, the workpiece (lunch box) 72 is maintained in a given posture. Thus, the workpiece 72 located in the workspace can be stopped in the space.

On the other hand, the first arm 10A performs a work to supply a given object to the workpiece (lunch box) 72 which became in the given posture. In the conveying state at this posture, the first arm 10A causes the sauce discharging device which is the work tool 73 to discharge sauce, while operating the hand part 15A so that the hand part 15A repeats a reciprocating movement in arrow 77 directions (the width directions of the conveyor 71). Thus, the sauce can be poured over the dish (e.g., the hamburg steak) located at the specific location of the workpiece (lunch box) 72. Since the workpiece 72 is conveyed one by one by the conveyor 71, if continuing the work (Step S4), the robot 1 returns to Step S1, where it stands by until the control device 6 acquires the next detection signal (until the next workpiece 72 is conveyed).

Therefore, according to this embodiment, the workpiece 72 located in the workspace is guided into the space by the guide tool 74 provided to the tip end of the arm 10B, according to the timing information for which the moving workpiece 72 reaches the workspace of the robot 1, and the work is performed to the workpiece 72 guided into the space by the work tool 73 provided to the tip end of the arm 10A. Thus, the work can be performed to the moving workpiece 72 according to the timing information, without performing a tracking control etc. of the workpiece 72. Thus, the robot which is capable of performing the specific work to the moving workpiece 72 can be realized with a comparatively simple structure.

Moreover, since the robot 1 is provided with the timing information detecting means 7, the timing at which the workpiece 72 reaches the workspace of the robot 1 can correctly be calculated. Note that, although in this embodiment the workpiece 72 is detected by the transmission type photoelectric sensor provided near the conveyor 71 which conveys the workpiece, it may be detected by a photoelectric sensor of a so-called reflection type or a regressive reflection type, without being limited to the transmission type photoelectric sensor. Moreover, the timing information for which the workpiece 72 reaches may be calculated by analyzing an image of a fixedly-installed camera.

Moreover, it becomes easy to maintain the posture of the workpiece 72 by supporting the one side surface of the workpiece 72 located in the workspace by the guide tool 74, and guiding the another side surface of the workpiece 72 toward the regulating member 8.

Second Embodiment

Next, a second embodiment is described. Below, description of the configuration which is common to the first embodiment is omitted, and only different configuration is described.

Figure 8:
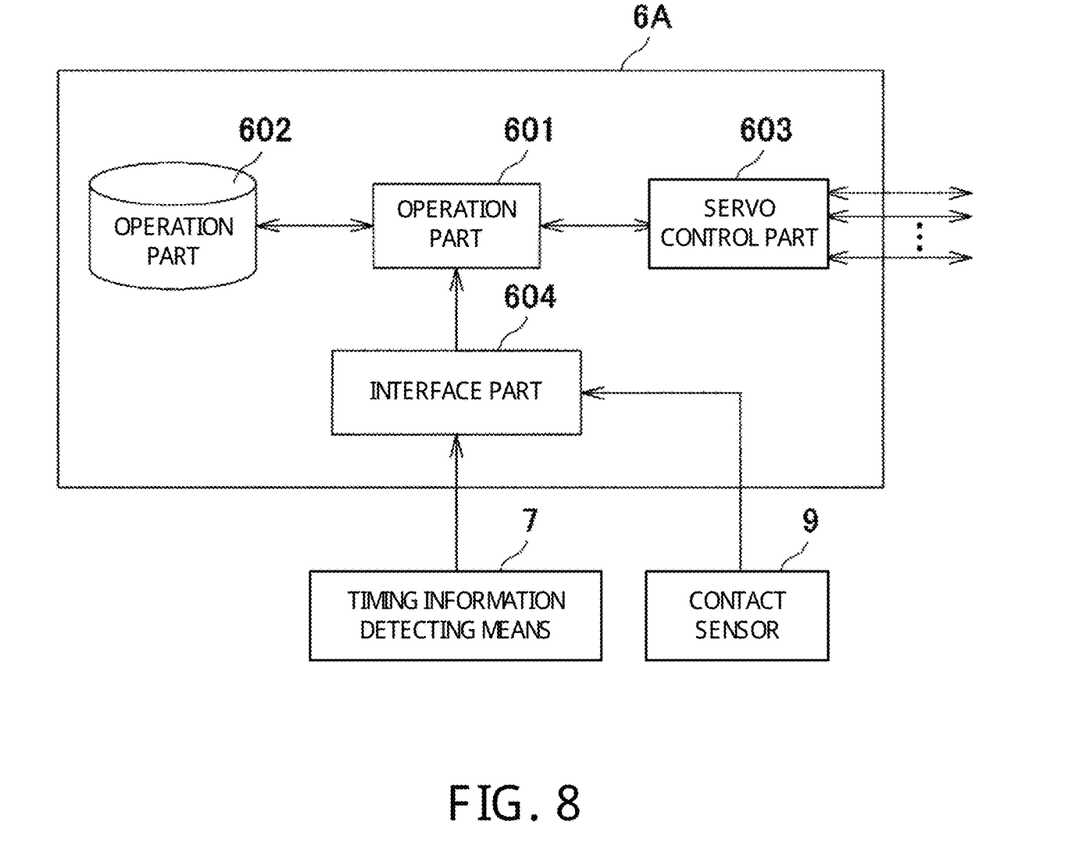
FIG. 8 is a block diagram illustrating an outline configuration of a control device of a robot according to a second embodiment.

FIG. 8 is a block diagram illustrating an outline configuration of the control device of the robot 1 according to the second embodiment. As illustrated in FIG. 8, the robot 1 of this embodiment differs in that it further includes a contact sensor 9 which detects the guide tool 74 contacting the workpiece 72 and outputs a detection signal to a control device 6A. Although in this embodiment the contact sensor 9 uses a distributed type pressure sensor, it may use other types of contact sensors, as long as it is capable of detecting the contact with an object.

Figure 9:
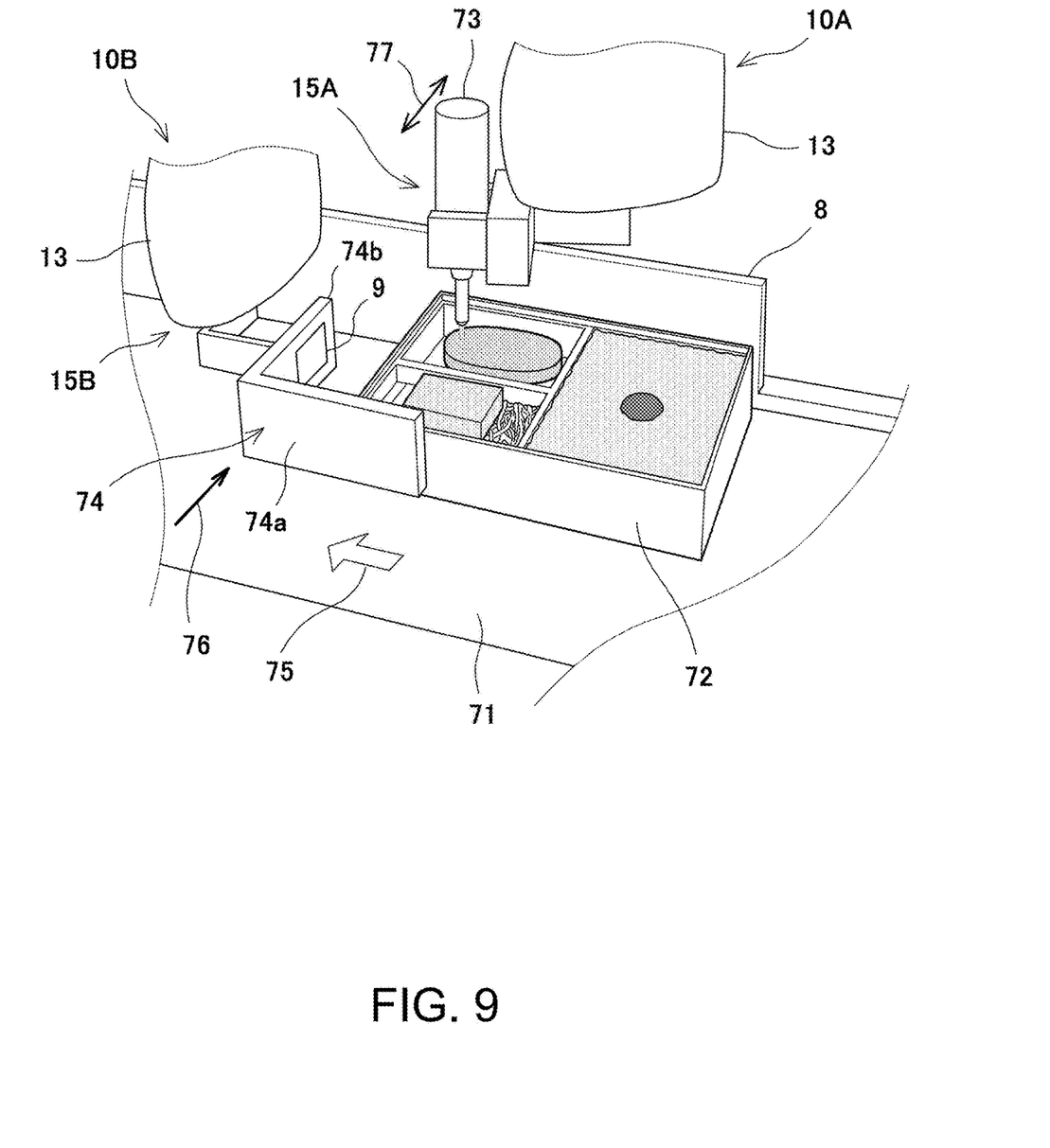
FIG. 9 is a view illustrating one example of operation by the robot.

FIG. 9 is a view illustrating one example of operation by the robot 1. The guide tool 74 is formed in the shape bent in the substantially L-shape in the plan view, and has a long-side part 74a and a short-side part 74b. In this embodiment, the contact sensor 9 is provided to an inner surface of the short-side part 74b. The contact sensor 9 detects that the workpiece (lunch box) 72 contacts the inner surface of the short-side part 74b of the guide tool 74.

As illustrated in FIG. 9, the control device 6A moves the guide tool 74 of the second arm 10B from the outside of the conveyor 71 in a direction of an arrow 76, according to the timing information. Here, if the control device 6A receives from the contact sensor 9 the detection signal indicative of detecting that the workpiece (lunch box) 72 contacts the inner surface of the short-side part 74b of the guide tool 74, it controls the guide tool 74 to follow the motion of the workpiece (lunch box) 72 conveyed by the conveyor 71, while supporting a tip end and a side surface of the workpiece (lunch box) 72 located in the workspace by the short-side part 74b and the long-side part 74a of the guide tool 74.

On the other hand, the first arm 10A performs the work to supply the given object to the workpiece (lunch box) 72 which became in the given posture by the guide tool 74. The first arm 10A causes the sauce discharging device which is the work tool 73 to discharge the sauce, while following the motion of the workpiece (lunch box) 72 conveyed by the conveyor 71 and operating the hand part 15A so that it repeats the reciprocating movement in the arrow 77 directions (the width directions of the conveyor 71). Thus, the sauce can be poured over the dish (e.g., the hamburg steak) at the specific location of the workpiece (lunch box) 72. Thus, in this embodiment, the control device 6A controls the operation of the first arm 10A to perform the specific work by the work tool 73 to the workpiece 72 when the contact sensor 9 detects that the guide tool 74 contacts the workpiece 72.

Note that, although in this embodiment it is configured so that the contact sensor 9 is provided to the inner surface of the short-side part 74b of the guide tool 74 and the specific work is performed while the motion of the workpiece 72 conveyed by the conveyor 71 is followed. The contact sensor 9 may be provided to an inner surface of the long-side part 74a, and after completely stopping the motion of the workpiece 72 on the conveyor 71 by the long-side part 74a of the guide tool 74, the specific work may be performed. The contact sensor 9 detects that the workpiece (lunch box) 72 contacts the inner surface of the long-side part 74a of the guide tool 74, and outputs the detection signal to the control device 6A. The control device 6A controls the operation of the second arm 10B to support the one side surface of the workpiece (lunch box) 72 located in the workspace by the long-side part 74a of the guide tool 74, and guide the another side surface of the workpiece (lunch box) 72 toward the regulating member 8. Thus, the movement of the workpiece (lunch box) 72 in the conveyor conveying direction is regulated and the workpiece (lunch box) 72 is maintained in the given posture. Thus, the sauce may be poured over the dish (e.g., the hamburg steak) at the specific location of the workpiece (lunch box) 72 after completely stopping the motion of the workpiece 72 on the conveyor 71.

Note that, although in each embodiment described above it is the work to apply the sauce to the content in the lunch box, it may be a work to apply soy sauce, dressing, etc. or a work to put contents, such as dishes, into the lunch box.

Note that although in each embodiment described above the sauce is poured while the lunch box is conveyed, the conveyor may be stopped after the lunch box becomes a specific posture and the sauce may be poured over the lunch box in the stationary state.

It is apparent for a person skilled in the art that many improvements and other embodiments of the present disclosure are possible from the above description. Therefore, the above description is to be interpreted only as illustration, and it is provided in order to teach a person skilled in the art the best mode that implements the present disclosure. Details of the structures and/or the functions may substantially be changed without departing from the spirit of the present disclosure.

INDUSTRIAL APPLICABILITY

The present disclosure is useful to the robot which performs a work similar to the work conventionally performed by a human.

DESCRIPTION OF REFERENCE CHARACTERS

1 Robot
6, 6A Control Device
7 Timing Information Detecting Means (Photoelectric Sensor)
8 Regulating Member
9 Contact Sensor
10 Robotic Arm
10A First Robotic Arm
10B Second Robotic Arm
15, 15A, 15B Hand Part
72 Workpiece (Lunch Box)
73 Work Tool (Sauce Discharging Device)
74 Guide Tool (L-shaped Guide Member)

What is claimed is:

1. A robot configured to [work on a] moving workpiece, comprising:
   a first robotic arm provided at a tip end thereof with a guide tool configured to support the workpiece;
   a second robotic arm provided at a tip end thereof with a work tool configured to perform a specific [task on] the workpiece; and a control device configured to control operations of the first and second robotic arms, wherein the control device controls the operations of the first and second robotic arms according to timing information [corresponding to the moment in time when] the workpiece reaches a workspace of the robot so that the guide tool guides the workpiece [into the workspace] and the work too performs the specific [task on] the workpiece guided into the [workspace].

2. The robot of claim 1, further comprising a detecting means for detecting a timing at which the workpiece reaches the workspace of the robot and outputting a detection signal to the control device.

3. The robot of claim 1, further comprising a contact sensor configured to detect that the guide tool contacts the workpiece and output a detection signal to the control device, wherein the control device controls the operation of the second robotic arm so that the work tool performs the specific work to the workpiece when the detection signal is received from the contact sensor.

4. The robot of claim 1, wherein, the first robotic arm is configured [via the guide tool] to [guide] a movement of the workpiece in a conveying direction and maintain the workpiece in a given posture, and the second robotic arm is configured [to supply at least one object to the workpiece being conveyed on the conveyor in the conveying direction].

5. The robot of claim 1, further comprising a regulating member configured to stop within the workspace the workpiece located in the workspace, wherein the first robotic arm supports one side surface of the workpiece located in the workspace by the guide tool and guides another side surface of the workpiece toward the regulating member.

\* \* \* \* \*